Feb. 10. 1925.
O. H. GRANSTEDT
DEMOUNTABLE RIM
Filed March 31. 1923
1,525,862
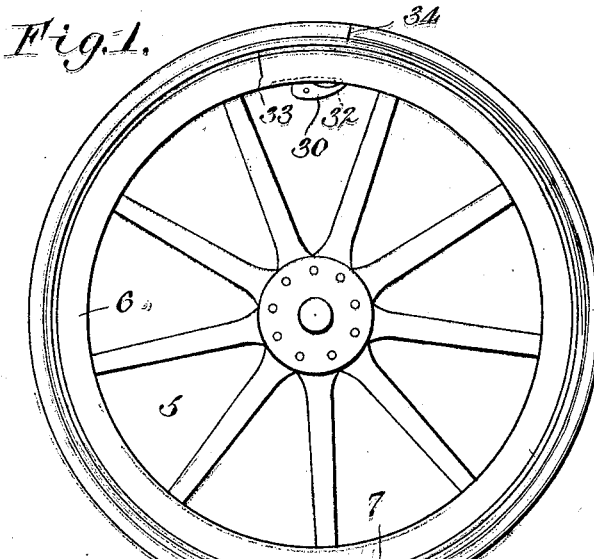
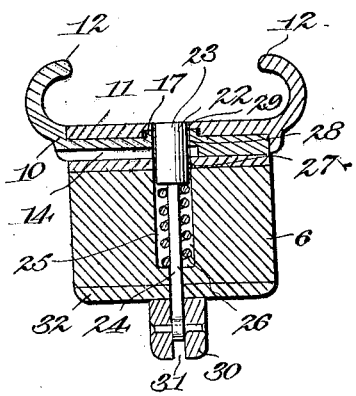
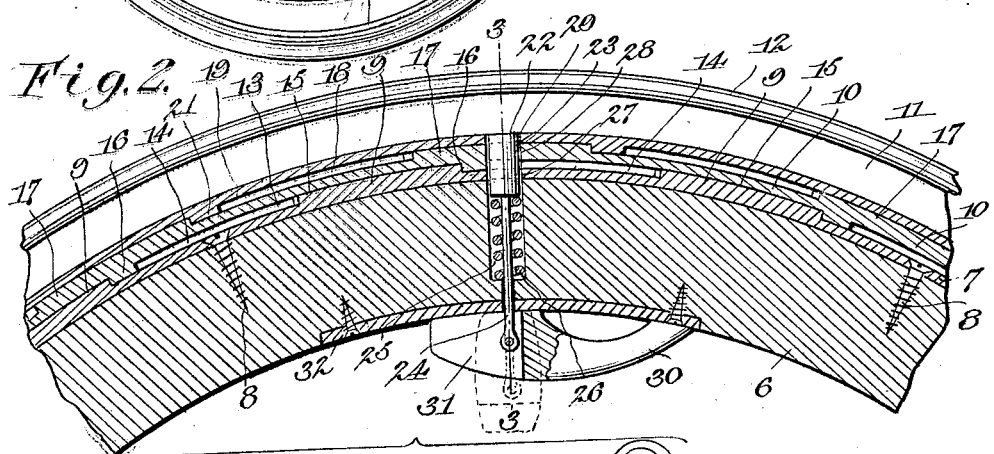
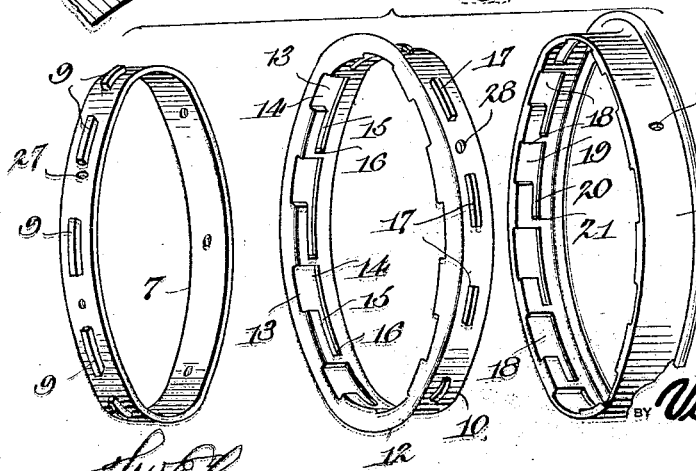
Oscar H. Granstedt,
INVENTOR
BY Victor J. Evans
ATTORNEY
WITNESS Patented Feb. 10, 1925.

1,525,862

UNITED STATES PATENT OFFICE.

OSCAR H. GRANSTEDT, OF RED BANK, NEW JERSEY.

DEMOUNTABLE RIM.

Application filed March 31, 1923. Serial No. 629,086.

*To all whom it may concern:*

Be it known that I, OSCAR H. GRANSTEDT, a citizen of the United States, residing at Red Bank, in the county of Monmouth and State of New Jersey, have invented new and useful Improvements in Demountable Rims, of which the following is a specification.

This invention relates to improvements in demountable rims for vehicle wheels, and the principal object of the invention is the provision of a rim which can be easily and quickly applied to or removed from the wheel when desired.

Another object of the invention is to provide a demountable rim capable of being attached to the felly of a vehicle wheel without the use of bolts, nuts and other securing devices.

A further object of the invention is to provide a demountable rim with a pair of sections, and including means for connecting the sections together, and a locking device common to both of the sections for retaining the rim upon the felly of the wheel.

A still further object of the invention is to provide a demountable rim whereby the tendency of the rim to creep with respect to the felly is eliminated.

A still further object of the invention is to provide a demountable rim which is simple in construction, cheap to manufacture and highly efficient for the purpose intended.

With these and other objects in view, the invention resides in the certain novel construction, combination and arrangement of parts, the essential features of which are hereinafter fully described in the specification, are pointed out in the claim, and illustrated in the accompanying drawing, in which:

Figure 1 is a side elevation of a vehicle wheel with my invention applied thereto.

Figure 2 is a detail longitudinal sectional view through a portion of the same.

Figure 3 is a transverse section on the line 3—3 of Figure 2.

Figure 4 is a collective perspective view of the several sections constituting my invention.

Referring more particularly to the drawing, the reference numeral 5 designates a vehicle wheel of the usual well-known construction, including a felly 6 to which my invention is shown applied. In practice I employ a ring section 7 adapted to be secured to the felly 6 by means of fastening elements 8 such as screws or the like, and extending centrally and circumferentially around the ring section 7 are ribs 9. There may be any number of these ribs 9, the amount depending upon the diameter of the rim, and the same are spaced equi-distantly apart.

My improved rim proper comprises two sections 10 and 11, each section provided with the usual tire engaging flange 12. The rim section 10 is provided interiorly with a plurality of equi-distantly spaced slots 13, corresponding in number to the ribs 9 of the ring 7. Each slot is provided with an enlarged portion 14 and a restricted portion 15, the restricted portion being closed to form a stop 16. The exterior periphery of the section 10 is formed with ribs 17, likewise spaced equi-distantly apart and adapted to co-act with the means on the section 11, which means will presently be described. When attaching the section 10 to the ring 7, the enlarged portions 14 of the slots 13 are brought into register with the ribs 9 of the ring section 7, after which the section 10 is telescoped into the ring 7, and the section 10 given a slight turn with respect to the ring 7 and in a counter clockwise direction so as to bring the ribs 9 into the restricted portion 15 of the slots 13, the said rib abutting the stop 16.

The section 11 has its interior surface formed with slots 18 similar to the slots 13 of the section 10, and each slot includes an enlarged portion 19 and a restricted portion 20, the restricted portion terminating in a stop 21. When applying, this section 10, the enlarged portions 19 of the slots 18 are brought into register with the ribs 17 of the section 10, and the same is telescoped onto the section 10 after which the section 10 is given a slight turn in a counter-clockwise direction to bring the ribs 17 into the restricted portion 20 and against the stop 21. It will thus be seen that the turning of a wheel in a clockwise direction will only cause the ribs 9 and 17 to abut the stops 16 and 21 respectively and with the tendency of the rim sections to creep is eliminated.

I provide a novel means of locking the rim sections 10 and 17 after the same have been moved to their proper positions upon the wheel. For this purpose I employ a bolt 22, having a head 23 and a reduced extension 24, the same being slidable in a recess 25 formed in the felly 6. Interposed between the head 23 and the bottom of the recess, is a helical spring 26 which is constantly tending to force the head into the apertures 27, 28 and 29 of the ring 7 and rim sections 10 and 11 respectively. A lever 30 is bifurcated as at 31 for pivotal connection with the extension 24 which fulcrums against the wear-plate 32 secured to the felly, when it is desired to retract the bolt 22 for removing the rim as shown by dotted lines in Figure 2 of the drawing. If desired the felly 6 and the rim section 11 may be provided with corresponding marks 33 and 34 adapted to be brought into register with each other when assembling, so as to position the apertures in alignment with the apertures 27 and 28 of the ring 7 and the rim section 10.

From the foregoing it will be understood that the sections 10 and 11 may be applied to the wheel as described, or the rim sections 10 and 11 may first be assembled and the whole rim inserted on the wheel at once.

It will thus be seen that there has been shown and described a rim capable of being quickly and easily removed from or applied to a vehicle wheel and whereby the usual tire casing may likewise be removed or applied to the rim.

Herein there has been shown and described what I consider to be the preferred form of my invention, it is to be understood that I do not wish to limit myself to the precise structural details herein exhibited, but that changes, alterations and modifications as come within the claim may be resorted to when desired.

What is claimed as new is:

A demountable rim comprising a pair of rim sections, one of which being adapted to be received within the other, a plurality of spaced longitudinal rectangular lugs arranged upon the center of the periphery of one of the sections and disposed in circumferential alinement, the other section being provided with substantially L-shaped recesses upon its inner face, each recess including a circumferentially extending branch which is of such width as to sungly accommodate one of the lugs and a laterally extending branch which opens upon one face and being of a width to permit the passage of the lugs therethrough, the latter section being adapted to be rotated to dispose the lugs in the circumferential branches, and means to lock the sections against accidental rotation, with respect to each other.

In testimony whereof I have affixed my signature.

OSCAR H. GRANSTEDT.